United States Patent
Koch et al.

(10) Patent No.: US 9,911,249 B2
(45) Date of Patent: Mar. 6, 2018

(54) FAIL OPERATIONAL POWER SYSTEM DIAGNOSTICS

(71) Applicant: GM GLOBAL TECHNOLOGY OPERATIONS LLC, Detroit, MI (US)

(72) Inventors: David P. Koch, Bloomfield Hills, MI (US); Chandra S. Namuduri, Troy, MI (US); Jeffrey James Hoorn, Northville, MI (US); Nikhil L. Hoskeri, Ann Arbor, MI (US); Mark C. Hoinka, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 912 days.

(21) Appl. No.: 14/017,126

(22) Filed: Sep. 3, 2013

(65) Prior Publication Data

US 2014/0081509 A1    Mar. 20, 2014

Related U.S. Application Data

(60) Provisional application No. 61/703,317, filed on Sep. 20, 2012.

(51) Int. Cl.
*G07C 5/08* (2006.01)
*B60R 16/023* (2006.01)

(52) U.S. Cl.
CPC ........ *G07C 5/0808* (2013.01); *B60R 16/0232* (2013.01)

(58) Field of Classification Search
CPC .......................... G07C 5/0808; B60R 16/0232
See application file for complete search history.

(56) References Cited

U.S. PATENT DOCUMENTS

| | | | | |
|---|---|---|---|---|
| 5,381,334 A | * | 1/1995 | Furui | B60R 21/0132 180/282 |
| 6,731,116 B2 | * | 5/2004 | Yamamoto | B60L 3/0015 324/503 |
| 7,123,460 B2 | * | 10/2006 | Ajit | H03K 17/08122 361/86 |
| 7,460,929 B2 | * | 12/2008 | Lopata | H02J 3/14 361/1 |
| 8,049,372 B2 | * | 11/2011 | Newhouse | B60L 11/18 307/115 |
| 8,134,335 B2 | * | 3/2012 | Osawa | G01R 31/007 320/116 |
| 8,646,565 B2 | * | 2/2014 | Gray, Jr. | B60K 6/12 180/305 |

(Continued)

FOREIGN PATENT DOCUMENTS

JP        2006219092 A    *    8/2006

*Primary Examiner* — Thienvu Tran
*Assistant Examiner* — Pinping Sun

(57) ABSTRACT

A method for operating a diagnostic system of a vehicle including a fail operational power system (FOPS) module and a fail operational system (FOS) module includes the FOS module requesting a microcontroller of the FOPS module to generate a diagnostic control signal. The FOS module receives the diagnostic information from a component module of the FOPS module based on the diagnostic control signal generated by the microcontroller. The FOS module executes isolator diagnostics based on the received diagnostic information.

20 Claims, 5 Drawing Sheets

(56) References Cited

U.S. PATENT DOCUMENTS

| | | | | |
|---|---|---|---|---|
| 2006/0268898 A1* | 11/2006 | Karam | ............... | H04L 12/10 370/401 |
| 2007/0255460 A1* | 11/2007 | Lopata | ............... | H02J 3/14 700/293 |
| 2007/0260904 A1* | 11/2007 | Camagna | ............... | H04L 12/10 713/310 |
| 2007/0271014 A1* | 11/2007 | Breed | ............... | B60J 10/00 701/31.9 |
| 2009/0306841 A1* | 12/2009 | Miwa | ............... | B60K 6/365 701/22 |
| 2010/0000804 A1* | 1/2010 | Yeh | ............... | B60K 16/00 180/2.2 |
| 2010/0138125 A1* | 6/2010 | Edlinger | ............... | B60T 17/228 701/70 |
| 2011/0144854 A1* | 6/2011 | Cramer | ............... | G07C 5/0808 701/29.1 |
| 2012/0025844 A1* | 2/2012 | Morita | ............... | B60L 3/0023 324/538 |
| 2012/0203405 A1* | 8/2012 | Wang | ............... | B60W 20/00 701/22 |

\* cited by examiner

FAIL OPERATIONAL POWER SYSTEM DIAGNOSTICS

CROSS REFERENCE TO RELATED APPLICATIONS

This application claims the benefit of U.S. Provisional Application No. 61/703,317, filed on Sep. 20, 2012, which is incorporated herein by reference.

TECHNICAL FIELD

This disclosure is related to providing critical electrical loads during electrical faults when a fail operational system is enabled.

BACKGROUND

The statements in this section merely provide background information related to the present disclosure. Accordingly, such statements are not intended to constitute an admission of prior art.

Autonomous driving systems and freeway limited-ability autonomous driving (FLAAD) systems utilize inputs regarding the road, environment, and other driving conditions to automatically control throttle, braking and steering mechanisms. Accurate estimation and identification of a clear path over which to operate a motor vehicle is desirable in replacing the human mind as a control mechanism for vehicle operation.

In any autonomous driving system, it is desirable that critical electrical loads for providing operation of the vehicle when autonomous driving is enabled are supplied uninterrupted power for a period of time, e.g., 5 seconds, during faults in any one of the electrical power sources or power distribution paths so that appropriate controllers associated with the critical electrical loads continue to function during the period of time.

The critical electrical loads can include fail operation system (FOS) loads powering controllers for operating various actuators and systems required for autonomous driving, e.g., when a FLAAD mode is enabled. It is required that the FOS loads be fail operational and receive a redundant power supply even during electrical faults in the electrical system for at least 5 seconds. When FLAAD mode is enabled, a continuous fault diagnosis is monitored to detect the existence of any faults in the electrical system. When a fault is detected during autonomous driving, i.e., when the FLAAD mode is enabled, the vehicle is configured to temporarily switch to lane centering and requires an immediate driver take-over. Accordingly, the vehicle desirably maintains lateral/longitudinal for at least a predetermined period of time, e.g., 5 seconds, during the driver take-over.

It is known, for example, to provide back-up power using additional batteries or ultra-capacitors for each FOS load when a loss of power is detected. Additional batteries or ultra-capacitors add mass and increased package size for each FOS load; increase cost if sized to support each FOS load individually; and do not support the entire electrical system or controllers of the vehicle, but only supports those FOS loads to which the additional batteries or ultra-capacitors are assigned.

SUMMARY

A method for operating a diagnostic system of a vehicle including a fail operational power system (FOPS) module and a fail operational system (FOS) module includes the FOS module requesting a microcontroller of the FOPS module to generate a diagnostic control signal. The FOS module receives the diagnostic information from a component module of the FOPS module based on the diagnostic control signal generated by the microcontroller. The FOS module executes isolator diagnostics based on the received diagnostic information.

BRIEF DESCRIPTION OF THE DRAWINGS

One or more embodiments will now be described, by way of example, with reference to the accompanying drawings, in which.

DETAILED DESCRIPTION

Figure 1:
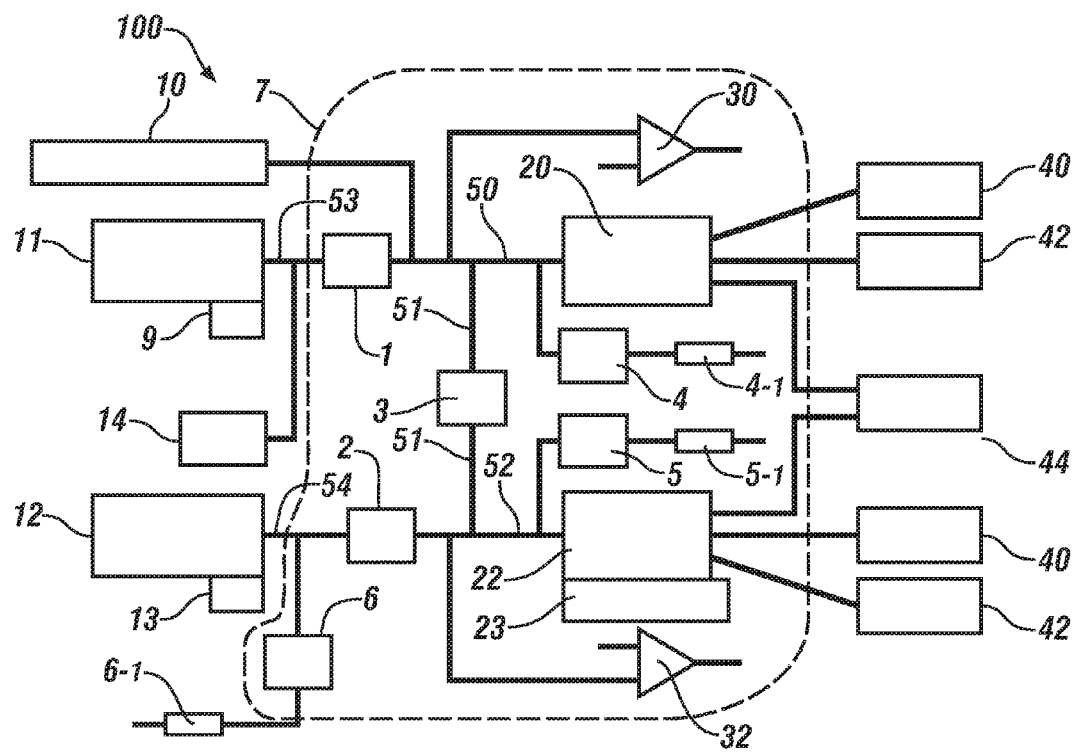
FIG. 1 illustrates an exemplary fail operational power system (FOPS) including two parallel power distribution paths each powered by an independent electrical source for supplying electrical power to critical loads partitioned on the two parallel power distribution paths, in accordance with the present disclosure.

Referring now to the drawings, wherein the showings are for the purpose of illustrating certain exemplary embodiments only and not for the purpose of limiting the same, FIG. 1 illustrates an exemplary fail operational power system (FOPS) 100 including two parallel power distribution paths each powered by an independent power source for supplying electrical power to critical loads partitioned on the two parallel power distribution paths, in accordance with the present disclosure. The FOPS 100 includes the first power source 11 and the second power source 12. The term "independent power source" can refer to a power source having the ability to independently source power during an abnormal condition such as an electrical fault within the FOPS The first independent power source 11 includes a first energy storage device (ESD), e.g., either a 12 V battery or ultra-capacitors both with an optional DC-DC converter, and is electrically coupled to a first electrical center 20 through a first isolator switch 1 via the first power distribution path 50. The first isolator switch 1 is effective when operative in a closed state to power the first power distribution path 50 via a first connector path 53 by the first independent power source 11. The second independent power source 12 includes a second ESD, e.g., a 12 V battery or ultracapacitors both with an optional DC-DC converter, electrically coupled to a second electrical center 22 through a second isolator switch 2 via the second power distribution path 52. The second isolator switch 2 is effective when operative in a closed state to power the second power distribution path 52 via a second connector path 54 by the second independent power source 12. Thus, the FOPS 100 includes two energy storage devices, each providing power only to a respective power distribution path. In one embodiment, a starter 14 can be powered by the first independent power source 11. Embodiments envisioned include never using the second independent power source 12 as a source of power for vehicle loads except if required to perform diagnostics or when required to power FOPS devices when an abnormal condition is detected. As used herein, the term "abnormal condition" can refer to an electrical fault in either of the first and second independent power sources 11, 12, respectively, and/or the first and second power distribution paths 50, 52, respectively. An electrical generator 10 providing 12 V power, as commonly employed as a 12 Volt Generator in conventional internal combustion (ICE) vehicles or as a high-voltage DC/DC converter in hybrid electric vehicles (HEVs), can be electrically coupled to the first electrical center 20 via the first power distribution path 50. A DC/DC converter 23 provides power to FOS electronic control units. The independent power sources 11 and 12 each include a respective Integrated Battery Sensor (IBS) 9 and 13 to support diagnostics. The IBSs 9 and 13 can measure the current and voltage of the respective power source. Accordingly, the IBSs can be evaluated to determine states of the respective power source including, but not limited to, state-of-charge (SOC), state-of-health (SOH) and state-of-function (SOF). It will be appreciated that some calculations may be performed within the IBSs 9 and 13 as well as within other electronic control units associated with the power source. In an exemplary embodiment, the electrical power fed by the second independent power source 12 to the second electrical center 22 is boosted by the DC/DC converter 23 to support low temperatures operation.

The FOPS 100 further includes first and second voltage detectors 30, 32, respectively. When a predetermined operating mode requiring fail operational power is enabled, each of the first and second voltage detectors 30, 32, respectively, can be configured to detect an abnormal condition such as an electrical fault in either of the first and second independent power sources 11, 12, respectively, and/or the first and second parallel power distribution paths 50, 52, respectively. As used herein, the term "predetermined operating mode requiring fail operational power" refers to any operating mode of the vehicle that must maintain operation in the presence of a power fault, such as the detection of the abnormal condition discussed herein. It will be understood that the term "predetermined operating mode" infers that fail operational power is required. The predetermined operating mode can include, but is not limited to, an autonomous driving mode, a semi-autonomous operating mode and a freeway limited-ability autonomous driving (FLAAD) mode. As used herein, the term "FLAAD mode" can refer to operation of the vehicle in one of the semi-autonomous driving mode and the autonomous driving mode on a freeway. The first voltage detector 30 can determine the abnormal condition on the first power distribution path 50 during the predetermined operating mode. For instance, the first voltage detector 30 monitors a first voltage on the first power distribution path 30, and compares the monitored first voltage to a reference voltage. If the monitored first voltage violates the reference voltage, the abnormal condition can be detected. The second voltage detector 32 can determine the abnormal condition on the second power distribution path 52 during the predetermined operating mode. For instance, the second voltage detector 32 monitors a second voltage on the second power distribution path 32, and compares the monitored second voltage to the reference voltage. If the monitored second voltage violates the reference voltage, the abnormal condition can be detected. In one embodiment, the reference voltage can include a first voltage range when a third isolator switch 3 is operative in a closed state. In a non-limiting example, the first voltage range can have a first lower limit of 10 V and a first upper limit of 16 V. In another embodiment, the reference voltage can include a second voltage range when the third isolator switch 3 is operative in an open state, i.e., subsequent to detection of the abnormal condition. In a non-limiting example, the second voltage range can have a second lower limit of 10.5 V and a second upper limit of 15.5 V. Thus, the second lower limit is greater than the first upper limit and the second upper limit is less than the first upper limit. In other words, the second voltage range is within the first voltage range.

Each of a plurality of fail operational system (FOS) loads 40, 42, 44 are partitioned on the first and second power distribution paths 50, 52, respectively. While the FOPS 100 of FIG. 1 illustrates first, second and third FOS loads 40, 42, 44, the FOPS 100 can include any number of FOS loads and is not limited to three FOS loads. FOS loads can include, but are not limited to, display modules, brake modules and camera modules for object detection and clear path determination. Simply put, the FOS loads 40, 42, 44 power controllers for operating various actuators and systems required for autonomous driving, e.g., when a FLAAD mode is enabled. Under normal conditions, the first electrical center 20 is configured to distribute a portion of the required load to each of the FOS loads 40, 42, 44 from the first independent power source 11 (e.g., first ESD) via the first power distribution path 50. Likewise, the second electrical center 20 is configured to distribute a remaining portion of the required load to each of the FOS loads 40, 42, 44 from the second independent power source 12 (e.g., second ESD) via the second power distribution path 52. In one embodiment, the first electrical center 20 distributes half the required load to each of the FOS loads 40, 42, 44 via the first power distribution path 50 and the second electrical center 22 distributes the other half of the required load to each of the FOS loads 40, 42, 44 via the second power distribution path 52. As used herein, the term "normal conditions" refers to conditions when the predetermined driving mode, e.g., FLAAD mode, is not enabled or the abnormal condition is not detected when the predetermined driving mode is enabled. Under such "normal conditions," the third isolator switch 3 is always closed, i.e., the isolator switch 3 is always operative in a closed state. In an exemplary embodiment, the predetermined operating mode including the FLAAD mode is only enabled when both independent power sources 11 and 12 are initially verified to be in a good SOH. In one embodiment, the good SOH can include the SOH having at least a 90% state-of-charge (SOC). For instance, the SOC of each of the first and second independent power sources 11, 12, respectively, can be monitored and compared to a SOC threshold, wherein the FLAAD mode is permitted to be enabled only if each of the monitored SOCs of the first and second power sources 11, 12, respectively, are at least the SOC threshold. In a non-limiting example, the SOC threshold is 90%. The FOS loads 40, 42, 44 are designed not to reset for a predetermined time (e.g., 100 microseconds) during periods when the reference is violated.

The third isolator switch 3 is configured to connect the parallel power distribution paths 50 and 52 via a third connector path 51 when the third isolator switch 3 is operative in the closed state. The third isolator switch 3 is operative in the closed state under normal conditions with voltage drops less than a predetermined value. In a non-limiting example, the predetermined value is 100 mV. When the abnormal condition is detected in the predetermined operating mode by at least one of the first and second voltage detectors 30, 32, respectively, a control signal forces the third isolator switch 3 to operate in an open state opening the connection between the power distribution paths 50 and 52. Operating the third isolator switch 3 in the open state enables the required power to be supplied to the FOS loads 40, 42, 44 in the presence of the abnormal condition for at least a fail operational time, e.g., 5 seconds, to provide operation in the predetermined operating mode until the vehicle operator takes-over control of the vehicle. An isolator switch controller 200 that evaluates specific operating conditions of the vehicle to generate the control signal to control the third isolator switch 3, along with the first and second isolator switches 1, 2, respectively, between open and closed states is discussed in greater detail below with reference to FIG. 2. In an exemplary embodiment, the third isolator switch 3 has a steady state load of 160 A and a transient load of 200 A.

The first isolator switch 1 is preferably used during engine auto-start events to isolate the FOPS 100 from voltage drops generated by the starter 14. The first isolator 1 can operative in an open state to provide open circuit voltage of the first independent power source 11. In an exemplary embodiment, the first isolator switch 1 has a steady state load of 160 A and a transient load of 200 A. The second isolator switch 2 can be utilized to isolate the second independent power source 12 from vehicle parasitic current during Key Off events and isolate the second independent power source 12 from a vehicle power grid when charged. The second isolator switch 2 can be configured to operate in a closed state to charge the second independent power source 12 only when the FOPS 100 voltage is greater than 13.2 V and less than a SOC of 90%. In an exemplary embodiment, the second isolator switch 2 has a steady state load of 160 A and a transient load of 275 A. The second isolator switch 2 can be configured to operate in an open state during a charge cycle when an instantaneous voltage is below 13.2 V to prevent discharge and cycling of the second independent power source 12. First and second snub switches 4, 5, respectively, are configured to snub voltages over a predetermined level, e.g., 16 V, from load dumps when the predetermined operating mode is enabled. The snub switches 4 and 5 each include a respective voltage clamp circuit on each load side of the third isolator switch 3 for maintaining the voltage within a predetermined range when the predetermined operating mode, e.g., FLAAD mode, is active and enabled. An exemplary voltage clamp circuit is described with reference to FIG. 6. Test load switch 6 and a test load are provided across the second independent power source 12 ESD to periodically check its SOH when the second isolator switch 2 is operative in the open state. In an exemplary embodiment, the snub switches 4 and 5 and the test load switch 6 each have a steady state load of 50 A and a transient load of 200 A. It will be appreciated that switches 1-6 and voltage detectors 30 and 32 are powered as an FOS load with full operation during fail operational period, e.g., 5 seconds.

Operation of the vehicle can further dictate the operation of the isolator switches 1, 2 and 3, the snub switches 4 and 5, and the test load switch 6 between the open and closed states. It will be appreciated that switches 1-6 are ON when operative in the closed state and OFF when operative in the open state. When the predetermined operating mode is inactive and disabled, the isolator switch 3 is ON. In an exemplary embodiment, when the predetermined operating mode is active, an active high signal is indicated. During a Key Off event, the first and third isolator switches 1, 3, respectively, are ON and the second isolator switch 2 is OFF. During a Key On event when the predetermined operating mode is inactive and disabled, the first and third isolator switches 1, 3, respectively, are ON and the second isolator switch 2 can be ON or OFF as a function of a state of charge of the second independent power source 12. When the first and second voltages are within the first voltage range, i.e., the normal condition is detected, the third isolator switch 3 is always ON. However, when at least one of the monitored first and second voltages is outside of the first voltage range, i.e., the abnormal condition is detected, the third isolator switch 3 is controlled to transition from operating in the closed state to operating in the open state. Prior to controlling the third isolator switch 3 to transition from the closed state to the open state, the second isolator switch 2 must be fully operational in the closed state. Accordingly, if the second isolator switch 2 is OFF when the abnormal condition is detected, the second isolator switch 2 must begin to transition from operating in the open state to operating in the closed state before the third isolator switch 3 begins to transition from operating in the closed state to operating in the open state. In an exemplary embodiment, the second isolator switch 2 begins to transition to the closed state a predetermined transitional time (e.g., 10 microseconds) before the third isolator switch 3 begins to transition to the open state. Similarly put, when the predetermined operating mode is enabled and at least one of the monitored first and second voltages 31, 33, respectively, are outside of the first voltage range, the third isolator switch 3 begins transitioning to the open state after the predetermined transitional time since the second isolator switch 2 began to transition to the closed state. The predetermined transitional time is selected to allow the second isolator switch 2 to complete the transition to the closed state before the third isolator switch 3 begins to transition to the open state.

A FOPS module 7 can be included, having supervisory control over the first voltage detector 30, the second voltage detector 32 and the switches 1-6. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 microseconds during ongoing engine and vehicle operation. Alternatively, routines may be executed in response to occurrence of an event.

Figure 2:
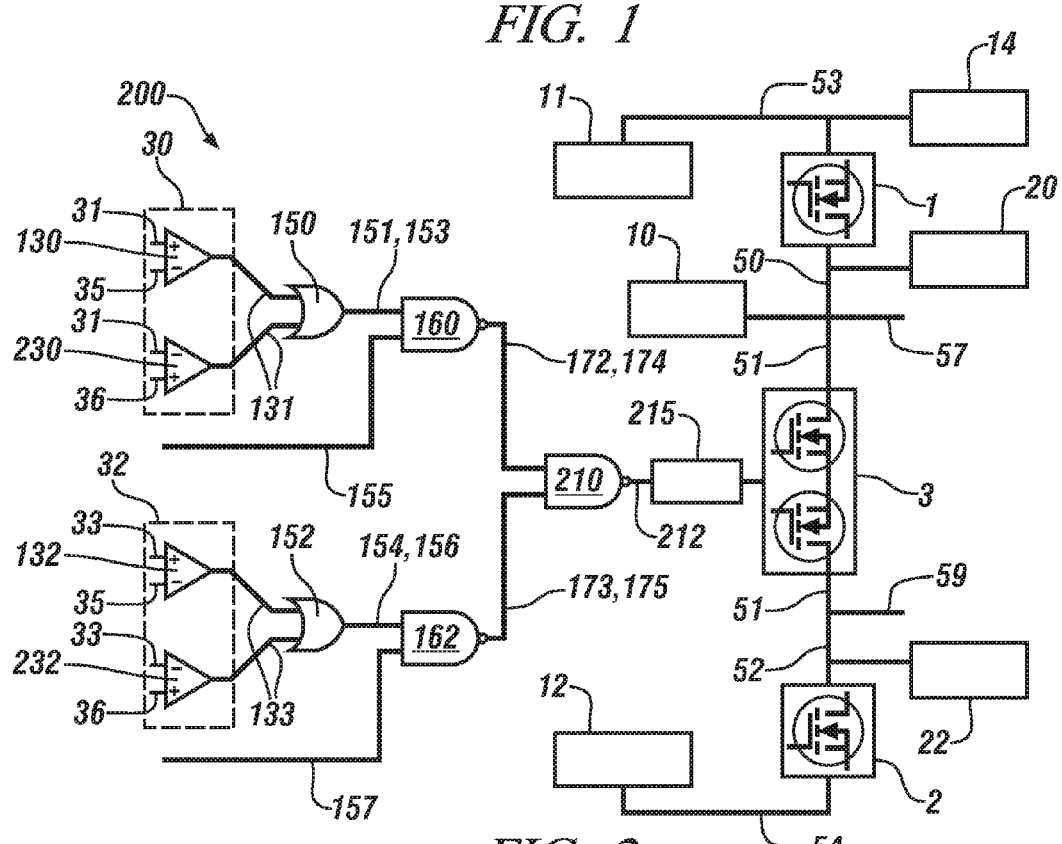
FIG. 2 illustrates an isolator switch controller 200 that evaluates specific operating conditions of the vehicle to generate a control signal to control first, second, and third isolator switches 1-3 of FIG. 1 between open and closed states, in accordance with the present disclosure.

FIG. 2 illustrates an isolator switch controller 200 that evaluates specific operating conditions of the vehicle to generate a control signal to control the third isolator switch 3, along with the first and second isolator switches 1, 2, respectively, with reference to FIG. 1 between open and closed states, in accordance with the present disclosure. The isolator switch controller 200 can be implemented within the FOPS module 7 of FIG. 1. As aforementioned, when the predetermined operating mode (e.g., FLAAD mode) is enabled, each of the first and second voltage detectors 30, 32, respectively, can be configured to detect the abnormal condition when at least one of the respective monitored first and second voltages violate the reference voltage. In an exemplary embodiment, the isolation switch controller 200 of FIG. 2 includes the reference voltage as one of the aforementioned first and second voltage ranges. For simplicity, the first and second voltage ranges will be collectively referred to as "voltage range."

In the illustrated embodiment, the first voltage detector 30 includes a first upper limit voltage detector 130 and a first lower limit voltage detector 230. The first upper limit voltage detector 130 compares the first monitored voltage 31 of the first power distribution path 50 to an upper limit threshold 35. The first lower limit voltage detector 230 compares the first monitored voltage 31 to a lower limit threshold 36. In one embodiment, the upper limit threshold 35 includes the first upper limit of 16 V of the first voltage range and the lower limit threshold 36 includes the first lower limit of 10 V of the first voltage range. In another embodiment, the upper limit threshold 35 includes the second upper limit of 15.5 V of the second voltage range and the lower limit threshold 36 includes the second lower limit of 10.5 V of the second voltage range which the voltage must fall after exceeding 16.0 V or increase after falling below 10 V to be considered voltage in range. This provides voltage detection hysteresis.

Each of the first upper and lower limit voltage detectors 130, 230, respectively, output a first range condition 131 indicating whether the first monitored voltage 31 is within the upper and lower limit thresholds 35, 36, respectively, or whether the first monitored voltage 31 is greater than the upper limit threshold 35 or less than the lower limit threshold 36. The first range condition 131 is input to a first fault module 150.

The first fault module 150 outputs one of a first fault condition 151 and a first no fault condition 153 into a first condition module 160. The first fault condition 151 is determined if the first range condition 131 indicates the first monitored voltage 31 is outside the upper and lower limit thresholds 35, 36, respectively, i.e., the first monitored voltage 31 of the first power distribution path 50 is out of range. The first no fault condition 153 is determined if the first range condition 131 indicates the first monitored voltage is within the upper and lower limit thresholds 35, 36, respectively. An operating mode input 155 is input to the first condition module 160 for comparison with one of the first fault condition 151 and the first no fault condition 153. The operating mode input 155 indicates whether the predetermined operating mode, e.g., FLAAD mode, is active and enabled, or whether the predetermined operating mode is inactive and disabled.

The first condition module 160 determines one of a first normal condition 172 and a first abnormal condition 174 on the first power distribution path 50. The first normal condition 172 on the first power distribution path 50 is determined whenever the operating mode input 155 indicates the predetermined operating mode is inactive and disabled. The first normal condition 172 is additionally determined whenever the predetermined operating mode is active and enabled and the first no fault condition 153 is detected. The first abnormal condition 174 is detected when the predetermined operating mode is active and enabled and the first fault condition 151 is detected. One of the first normal and abnormal conditions 172, 174, respectively, is input to an isolator condition module 210.

Similarly, the second voltage detector 32 includes a second upper limit voltage detector 132 and a second lower limit voltage detector 232. The second upper limit voltage detector 132 compares the second monitored voltage 33 of the second power distribution path 52 to the upper limit threshold 35. The second lower limit voltage detector 232 compares the second monitored voltage 33 to the lower limit threshold 36.

Each of the second upper and lower limit voltage detectors 132, 232, respectively, output a second range condition 133 indicating whether the second monitored voltage 33 is within the upper and lower limit thresholds 35, 36, respectively, or whether the second monitored voltage 33 is greater than the upper limit threshold 35 or less than the lower limit threshold 36. The second range condition 133 is input to a second fault module 152.

The second fault module 152 outputs one of a second fault condition 154 and a second no fault condition 156 into a second condition module 162. The second fault condition 154 is determined if the second range condition 133 indicates the second monitored voltage 33 is outside the upper and lower limit thresholds 35, 36, respectively, i.e., the second monitored voltage 33 of the second power distribution path 52 is out of range. The second no fault condition 156 is determined if the second range condition 133 indicates the second monitored voltage 33 is within the upper and lower limit thresholds 35, 36, respectively. The operating mode input 155 is input to the second condition module 162 for comparison with one of the second fault condition 154 and the second no fault condition 156.

The second condition module 162 determines one of a second normal condition 173 and a second abnormal condition 175 on the second power distribution path 52. The second normal condition 173 on the second power distribution path 52 is determined whenever the operating mode input 157 indicates the predetermined operating mode is inactive and disabled. The second normal condition 173 is additionally determined whenever the predetermined operating mode is active and enabled and the second no fault condition 156 is detected. The second abnormal condition 175 is detected when the predetermined operating mode is active and enabled and the second fault condition 154 is detected. One of the second normal and abnormal conditions 173, 175, respectively, is input to the isolator condition module 210.

The isolator condition module 210 outputs a control signal 212 that is input to a driver 215. The control signal 212 can include an isolator switch ON request when both the first and second normal conditions 172, 173, respectively, are detected. Accordingly, the driver 215 outputs the isolator switch ON request to the third isolator switch 3 to operate the isolator switch 3 in the closed state or to allow the third isolator switch 3 to remain operative in the closed state.

Likewise, the control signal 212 can include an isolator switch OFF request when at least one of the first and second abnormal conditions 174 and 175, respectively, are detected. As aforementioned, the second isolator switch 2 is configured to transition to the closed state before the switch OFF command is sent to the third isolator switch 3 to operate the third isolator switch 3 in the open state. Accordingly, the driver 215 outputs the isolator switch OFF request to the isolator switch 3 to operate the third isolator switch 3 in the open state or to allow the third isolator switch 3 to remain operative in the open state. In an exemplary embodiment, the isolator switch 3 can be OFF, e.g., in the open state, during diagnostic testing of the first and second power distribution paths 50, 52, respectively. A first diagnostic input 57 can include a monitored voltage of the first electrical center 20 and a second diagnostic input 59 can include a monitored voltage of the second electrical center 22.

Figure 3:
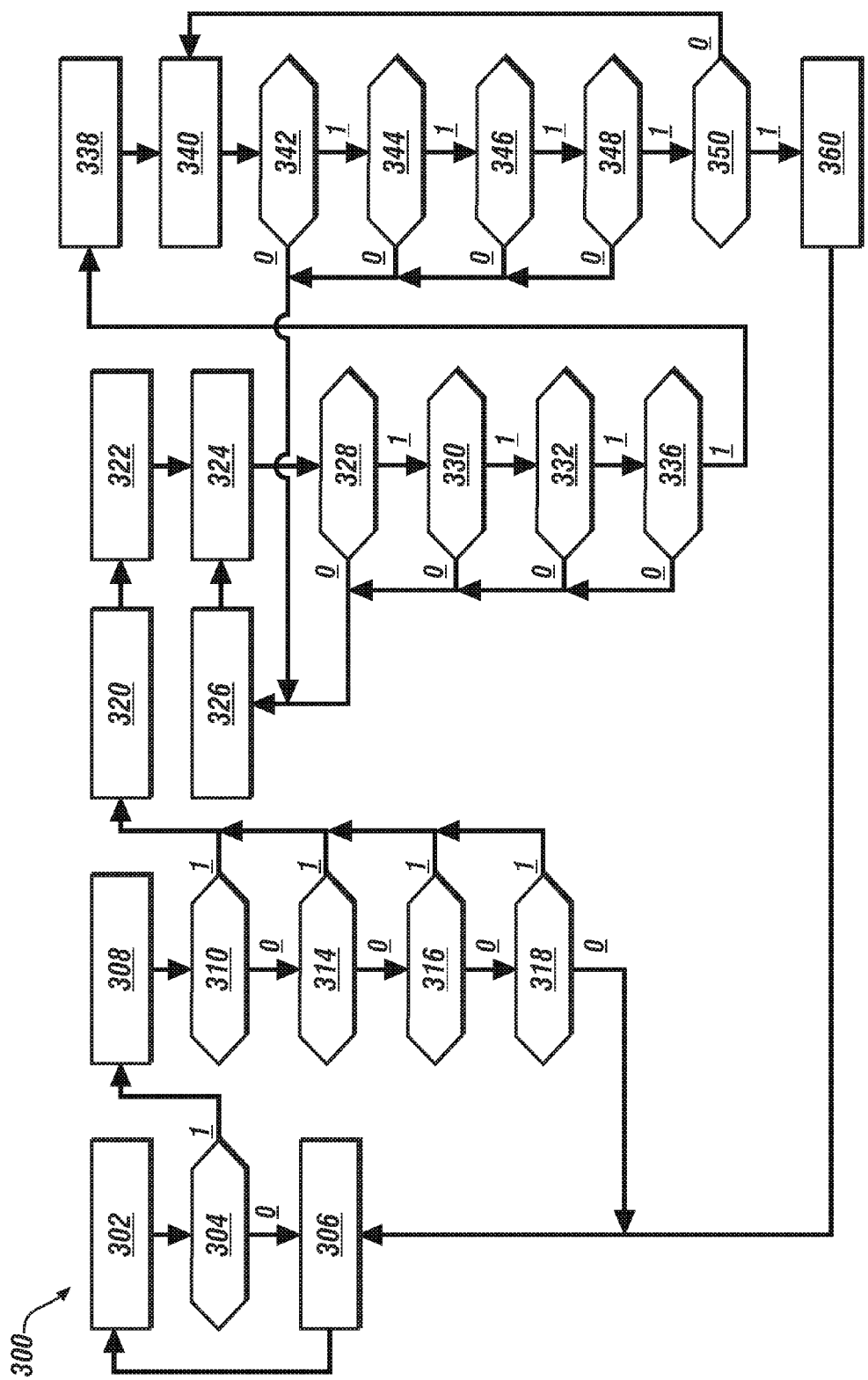
FIG. 3 illustrates an exemplary flowchart 300 for evaluating the FOPS 100 of FIG. 1 to generate the control signal 212 of FIG. 2 for controlling the isolator switch 3 between open and closed states, in accordance with the present disclosure.

FIG. 3 illustrates an exemplary flowchart 300 for evaluating the FOPS 100 of FIG. 1 with reference to the isolator switch controller 200 of FIG. 2 to generate the control signal 212 for operating the third isolator switch 3 between the open and closed states, in accordance with the present disclosure. The exemplary flowchart 300 can be implemented within the FOPS module 7 of FIG. 1. Table 1 is provided as a key to FIG. 3 wherein the numerically labeled blocks and the corresponding functions are set forth as follows.

TABLE 1

| BLOCK | BLOCK CONTENTS |
| --- | --- |
| 302 | Monitor operating mode. |
| 304 | Is vehicle operating in a predetermined operating mode? |
| 306 | Leave third isolator switch 3 closed. |
| 308 | Monitor the first voltage 31 and the second voltage 33. |
| 310 | Is the first monitored voltage 31 greater than the upper limit threshold 35 for a first time period? |
| 314 | Is the first monitored voltage 31 less than the lower limit threshold 36 for the first time period? |
| 316 | Is the second monitored voltage 33 greater than the upper limit threshold 35 for the first time period? |
| 318 | Is the second monitored voltage 33 less than the lower limit threshold 36 for the first time period? |
| 320 | Set flag indicating that at least one of the first and second monitored voltages 31 and 33 is out of range. |
| 322 | Open third isolator switch 3. |
| 324 | Monitor the first voltage 31 and the second voltage 33. |
| 326 | Reset a timer for a second time period. |
| 328 | Is the first monitored voltage 31 less than the upper limit threshold 35? |
| 330 | Is the first monitored voltage greater than the lower limit threshold 36? |
| 332 | Is the second monitored voltage less than the upper limit threshold 35? |
| 336 | Is the second monitored voltage greater than the lower limit threshold 36? |
| 338 | Set the timer for the second time period. |
| 340 | Monitor the first voltage 31 and the second voltage 33. |
| 342 | Is the first monitored voltage 31 less than the upper limit threshold? |
| 344 | Is the first monitored voltage greater than the lower limit threshold? |
| 346 | Is the second monitored voltage less than the upper limit threshold 35? |
| 348 | Is the second monitored voltage greater than the lower limit threshold 36? |
| 350 | Has the second time period elapsed? |
| 360 | Reset flag indicating that at least one of the first and second monitored voltages 31 and 33 is out of range. |

At block 302, operating mode status is monitored and the flowchart proceeds to decision block 304. Decision block 304 determines if the vehicle is operating in the predetermined operating mode, i.e., FLAAD mode. A "0" denotes the vehicle is not operating in the predetermined operating mode and the flowchart 300 proceeds to block 306 where the third isolator switch 3 is to remain operative in the closed state, i.e., control signal 212 includes the isolator switch ON request. A "1" denotes the vehicle is operating in the predetermined operating mode and the flowchart 300 proceeds to block 308. In one embodiment, the decision of decision block 304 is the operating mode input 155 of FIG. 2.

At block 308, voltages of the first and second electrical centers 20, 22, respectively, are monitored. Monitoring the voltages includes the first voltage 31 of the first power distribution path 50 and the second voltage 33 of the second power distribution path 52.

Decision block 310 determines if the first monitored voltage 31 is greater than the upper limit threshold 35 for a first time period. A "0" denotes the first monitored voltage 31 is not greater than the upper limit threshold 35 for the first time period and the flowchart 300 proceeds to decision block 314. A "1" denotes the first monitored voltage 31 is greater than the upper limit threshold 35 for the first time period and the flowchart 300 proceeds to block 320.

Decision block 314 determines if the first monitored voltage 31 is less than the lower limit threshold 36 for the first time period. A "0" denotes the first monitored voltage 31 is not less than the lower limit threshold 36 for the first time period and the flowchart 300 proceeds to decision block 316. A "1" denotes the first monitored voltage 31 is less than the lower limit threshold 36 for the first time period and the flowchart proceeds to block 320.

Decision block 316 determines if the second monitored voltage 33 is greater than the upper limit threshold 35 for the first time period. A "0" denotes the second monitored voltage 33 is not greater than the upper limit threshold 35 for the first time period and the flowchart 300 proceeds to decision block 318. A "1" denotes the second monitored voltage 33 is greater than the upper limit threshold 35 for the first time period and the flowchart 300 proceeds to block 320.

Decision block 318 determines if the second monitored voltage 33 is less than the lower limit threshold 36 for the first time period. A "0" denotes the second monitored voltage 33 is not less than the lower limit threshold 36 for the first time period and the flowchart 300 proceeds to block 306 where the third isolator switch 3 is to remain operative in the closed state, i.e., control signal 212 includes the isolator switch ON request. A "1" denotes the second monitored voltage 33 is less than the lower limit threshold 36 for the first time period and the flowchart proceeds to block 320.

It will be appreciated that in each of decision blocks 310, 314, 316 and 318, the upper limit threshold 35 includes the first upper limit of 16 V and the lower limit threshold 36 includes the first lower limit of 10 V. In an exemplary embodiment, the first time period is 50 microseconds.

At block 320, a flag is set indicating that at least one of the first and second monitored voltages 31, 33, respectively, violates the reference voltage. In other words, at least one of the first and second abnormal conditions 174, 175, respectively, of FIG. 2 is detected. Simply put, the flag indicates that at least one of the first and second monitored voltages 31, 33, respectively, are outside of the first voltage range. In anticipation of transitioning the third isolator switch 3 to the open state, the second isolator switch 2 must begin to transition to the closed state a predetermined transitional time before the third isolator switch 3 begins to transition to the open state. In a non-limiting example, the predetermined transitional time is 10 microseconds.

The flowchart 300 proceeds to block 322 where the third isolator switch 3 is to be operative in the open state, i.e., control signal 212 includes the isolator switch OFF request. However, operating the third isolator switch 3 in the open state is forbidden until the second isolator switch 2 is operative in the closed state to isolate the second independent power source 12 from parasitic current. The control signal 212 including the isolator switch OFF request at block 322 controls the third isolator switch 3 to transition from operating in the closed state to operating in the open state such that the connection via the third connector path 51 between the first and second power distribution paths 50, 52, respectively, is opened and the second independent power source 12 is isolated from vehicle parasitic current. In other words, the third isolator switch 3 is operative in the open state if at least one of the monitored first and second voltages 31, 33, respectively, is below 10 V, e.g., first lower limit, for greater than 50 microseconds. Likewise, the isolator switch 3 is operative in the open state if at least one of the monitored voltages 31, 33, respectively, is above 16.0 V, e.g., first upper limit, for greater than 50 microseconds.

As will become apparent, the third isolator switch 3 remains in the open state until both the monitored first and second voltages 31 and 33 are within the second voltage range. For instance, the third isolator switch 3 will remain in the open state if one of the monitored first and second voltages 31, 33, respectively, is below the second lower limit, e.g., 10.5 V. Likewise, the third isolator switch 3 will remain in the open state if one of the monitored first and second voltages 31, 33, respectively, is greater than the second upper limit, e.g., 15.5 V.

At block 324, voltages of the first and second electrical centers 20, 22, respectively are monitored. Monitoring the voltages includes the first monitored voltage 31 of the first power distribution path 50 and the second monitored voltage 33 of the second power distribution path 52.

Decision block 328 determines if the first monitored voltage 31 is less than the upper limit threshold 35. A "0" denotes the first monitored voltage 31 is not less than the upper limit threshold 35 and the flowchart 300 proceeds to block 326. A "1" denotes the first monitored voltage 31 is less than the upper limit threshold 35 and the flowchart proceeds to block 330.

Decision block 330 determines if the first monitored voltage 31 is greater than the lower limit threshold 36. A "0" denotes the first monitored voltage 31 is not greater than the lower limit threshold 36 and the flowchart 300 proceeds to block 326. A "1" denotes the first monitored voltage 31 is greater than the lower limit threshold 36 and the flowchart proceeds to block 332.

Decision block 332 determines if the second monitored voltage 33 is less than the upper limit threshold 35. A "0" denotes the second monitored voltage 33 is not less than the upper limit threshold 35 and the flowchart 300 proceeds to block 326. A "1" denotes the second monitored voltage 33 is less than the upper limit threshold 35 and the flowchart proceeds to block 336.

Decision block 336 determines if the second monitored voltage 33 is greater than the lower limit threshold 36. A "0" denotes the second monitored voltage 33 is not greater than the lower limit threshold 36 and the flowchart 300 proceeds to block 326. A "1" denotes the second monitored voltage 33 is greater than the lower limit threshold 36 and the flowchart proceeds to block 338.

It will be appreciated that in each of decision blocks 328, 330, 332 and 336, the upper limit threshold 35 includes the second upper limit of 15.5 V and the lower limit threshold 36 includes the second lower limit of 10.5 V. Accordingly, the third isolator switch 3 remains operative in the open state when at least one of the monitored first and second voltages is outside of the second voltage range.

Block 326 resets a timer for a second time period. In a non-limiting embodiment, the second time period is 1 millisecond.

At block 338, the timer is set for the second time period, e.g., 1 millisecond, before proceeding to block 340.

At block 340, voltages of the first and second electrical centers 20, 22, respectively, are monitored. Monitoring the voltages includes the first monitored voltage 31 of the first power distribution path 50 and the second monitored voltage 33 of the second power distribution path 52.

Decision block 342 determines if the first monitored voltage 31 is less than the upper limit threshold 35. A "0" denotes the first monitored voltage 31 is not less than the upper limit threshold 35 and the flowchart 300 proceeds to block 326. A "1" denotes the first monitored voltage 31 is less than the upper limit threshold 35 and the flowchart proceeds to block 344.

Decision block 344 determines if the first monitored voltage 31 is greater than the lower limit threshold 36. A "0" denotes the first monitored voltage 31 is not greater than the lower limit threshold 36 and the flowchart 300 proceeds to block 326. A "1" denotes the first monitored voltage 31 is greater than the lower limit threshold 36 and the flowchart proceeds to block 346.

Decision block 346 determines if the second monitored voltage 33 is less than the upper limit threshold 35. A "0" denotes the second monitored voltage 33 is not less than the upper limit threshold 35 and the flowchart 300 proceeds to block 326. A "1" denotes the second monitored voltage 33 is less than the upper limit threshold 35 and the flowchart proceeds to block 348.

Decision block 348 determines if the second monitored voltage 33 is greater than the lower limit threshold 36. A "0" denotes the second monitored voltage 33 is not greater than the lower limit threshold 36 and the flowchart 300 proceeds to block 326. A "1" denotes the second monitored voltage 33 is greater than the lower limit threshold 36 and the flowchart proceeds to block 350.

It will be appreciated that in each of decision blocks 342, 344, 346, 348, the upper limit threshold 35 includes the second upper limit of 15.5 V and the lower limit threshold 36 includes the second lower limit of 10.5 V.

Decision block 350 determines if the second time period has elapsed. A "0" denotes the second time has not elapsed and the flowchart reverts back to block 340. A "1" denotes the second time period has elapsed and the flowchart 300 proceeds to block 360.

Block 360 resets the flag indicating that the at least one of the first and second monitored voltages 31, 33, respectively, are out of range. Thus, both the first and second monitored voltages 31, 33, respectively are within range. In other words, the first and second normal conditions 172, 173, respectively, of FIG. 2 are detected. The flowchart proceeds to block 306 where the third isolator switch 3 is controlled to transition from operating in the open state to operating in the closed state, i.e., control signal 212 includes the isolator switch ON request. In other words, the third isolator switch 3 is operative in the closed state when the first and second monitored voltages 31, 33, respectively, are within the second voltage range, e.g., between the second upper limit of 15.5 V and the second lower limit of 10.5 V.

Figure 4:
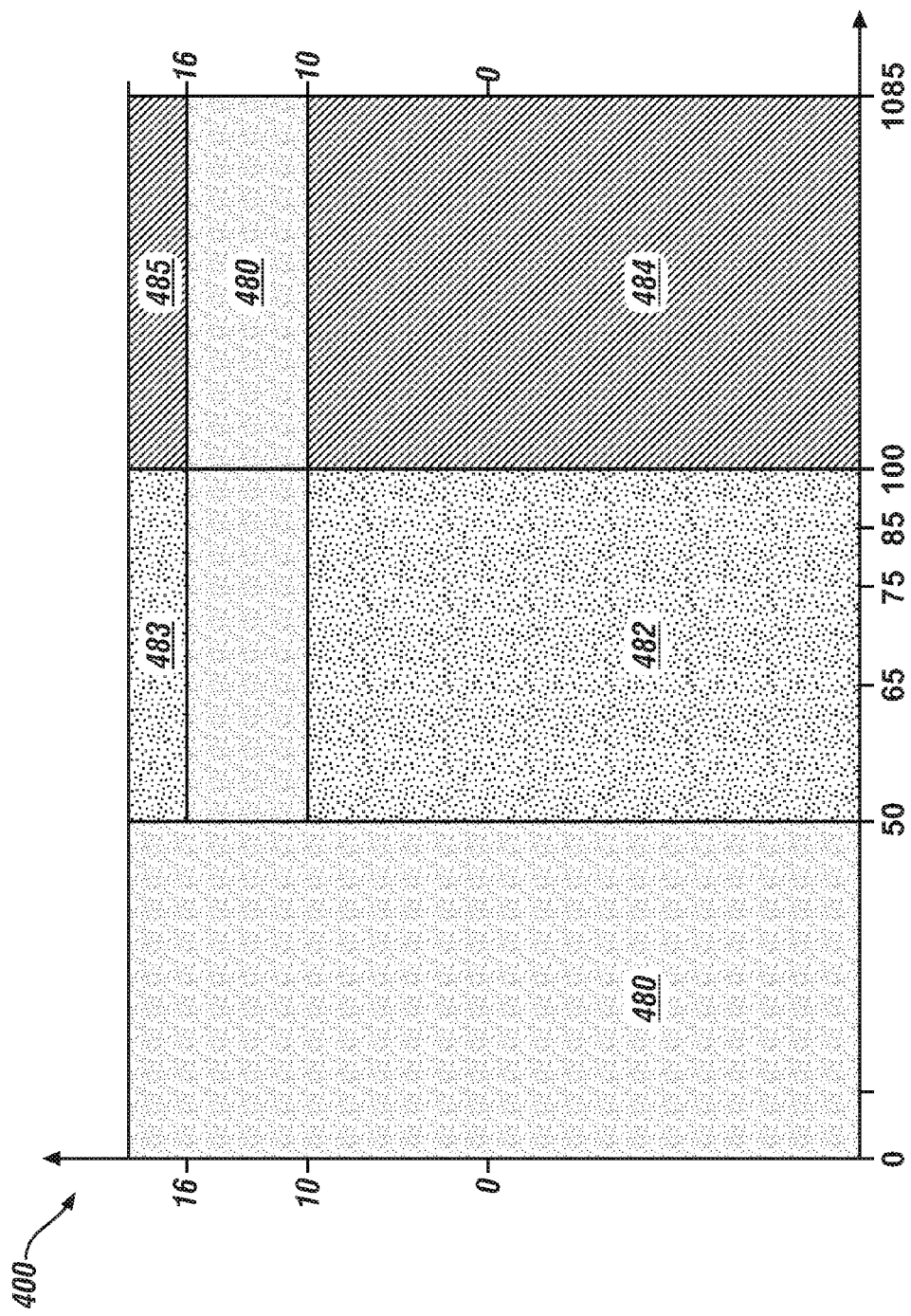
FIG. 4 illustrates an exemplary plot illustrating operation of the FOPS 100 of FIG. 1 when a predetermined operating mode is enabled in response to vehicle system voltage, in accordance with the present disclosure.

FIG. 4 illustrates an exemplary plot 400 illustrating operation of the FOPS 100 of FIG. 1 in response to vehicle system voltage when the predetermined operating mode, e.g., FLAAD, is enabled, in accordance with the present disclosure. Plot 400 will be described with reference to FIGS. 1-3. The vertical y-axis denotes voltage in volts. The horizontal x-axis denotes time in microseconds from 0 to 1,085 microseconds. Dashed vertical lines represent a time at 50 microseconds, 65 microseconds, 75 microseconds, 85 microseconds and 100 microseconds. Area 480 denotes a normal zone defined by the entire voltage range from 0 to 50 microseconds and between 10 V and 16 V from 50 to 1,085 microseconds. Areas 482 and 483 each denote a transition to a fail operational mode zone. Area 482 is defined by all voltages below 10 V from 50 to 100 microseconds. Area 483 is defined by voltages greater than 16 V from 50 to 100 microseconds. Areas 484 and 485 each denote a fail operational mode zone. Area 484 is defined by voltages below 10 V from 100 to 1,085 microseconds. Area 485 is defined by voltages greater than 16 V from 100 to 1,085 microseconds. It will be appreciated that the transition to fail operational mode zone of areas 482 and 483 can include the fail operational mode zone beginning at 85 microseconds.

The normal zone of area 480 includes detection of both the first normal condition 172 and the second normal condition 173 by the isolator controller 200 of FIG. 2. For instance, both the first voltage detector 30 and the second voltage detector 32 detect both the monitored first and second voltages 31, 33, respectively, are within the first voltage range, e.g., less than 16 V and greater than 10 V and the predetermined operating mode is active and enabled. Within the normal zone of area 480, the third isolator switch 3 always remains operative in the closed state.

The transition to fail operational mode zone of areas 482 and 483 includes detection of at least one of the first and second abnormal conditions 174, 175, respectively, by the isolation controller of FIG. 2. For instance, the fail operational mode zone of area 483 occurs when at least one of the first and second voltage detectors 30, 32, respectively, has detected that at least one of the monitored first and second voltages 31, 33, respectively, is greater than the first upper limit, e.g., 16 V, for at least the first time period. Similarly, the fail operational mode zone of area 482 occurs when at least one of the first and second voltage detectors 30, 32, respectively, has detected that at least one of the monitored first and second voltages 31, 33, respectively, is less than the first lower limit, e.g., 10 V, for at least the first time period. In an exemplary embodiment, the first time period is 50 microseconds as illustrated from 0 to 50 microseconds in plot 400.

During the occurrence of the transition to the fail operational mode zone (e.g., areas 482 and 483) when the voltage is out of range, the flag is set at 50 microseconds indicating that at least one of the monitored first and second voltages 31, 33, respectively, are out of range, as determined by block 320 of flowchart 300 of FIG. 3. At 65 microseconds, the second isolator switch 2 begins to transition from operation in the open state to operation in the closed state. As aforementioned, the third isolator switch 3 is not permitted to transition from the closed state to the open state unless the second isolator switch 2 is fully operative in the closed state. At 75 microseconds, the current through the third isolator switch 3 is reduced to zero and the third isolator switch 3 is transitioned to operate in the open state, in response to the isolator switch OFF request by the control signal 212 to the driver 215. It will be appreciated that the transition to the closed state of the second isolator switch 2 must be complete at 75 microseconds. It will be recognized that the period between 65 microseconds and 75 microseconds is indicative of the aforementioned predetermined transitional time, e.g., 10 microseconds. At 85 microseconds, the transition to the open state of the third isolator switch 3 is complete and the third connector path 51 illustrated in FIG. 1 is open, i.e., the first and second power distribution paths 50, 52, respectively, are disconnected.

During the occurrence of the transition to the fail operational mode zone when the third isolator switch 3 is fully operational in the open state (e.g., areas 482 and 482 at 85 microseconds), the timer is set at 1 millisecond to determine if both monitored first and second voltages 31, 33, respectively, fall back within the second voltage range, as determined by block 338 of flowchart 300 of FIG. 3. Referring to area 485, at least one of the monitored first and second voltages 31, 33, respectively, is greater than the first upper limit, e.g., 16 V. Accordingly, the first and second snub switches 4, 5, respectively, are actively snubbing since the predetermined operating mode (e.g., FLAAD mode) was enabled, in order to snub voltages exceeding the first upper limit of 16 V from load dumps.

At 1,085 microseconds (i.e., 1 millisecond since 85 microseconds), the third isolator switch 3 is transitioned from the operating in the open state to operating in the closed state in response to one of: the monitored first and second voltages 31, 33, respectively, both being less than the second upper limit of 15.5 V for at least the second time period (e.g., 1 millisecond) when at least one of the respective first and second monitored voltages 31, 33, respectively, were previously above the first upper limit of 16 V from 50 to 85 microseconds; and the first and second monitored voltages 31, 33, respectively, both being greater than the second lower limit of 10.5 V for at least the second time period (e.g., 1 millisecond) when at least one of the respective first and second monitored voltages 31, 33, respectively, were previously less than the first lower limit of 10 V from 50 to 85 microseconds. It will be appreciated that bias power of the switches 1-6 is derived such that switching of the third isolator switch 3 shall not affect operation of the remaining switches during the fail operational mode, e.g., for 5 seconds until the operator takes over.

Figure 5:
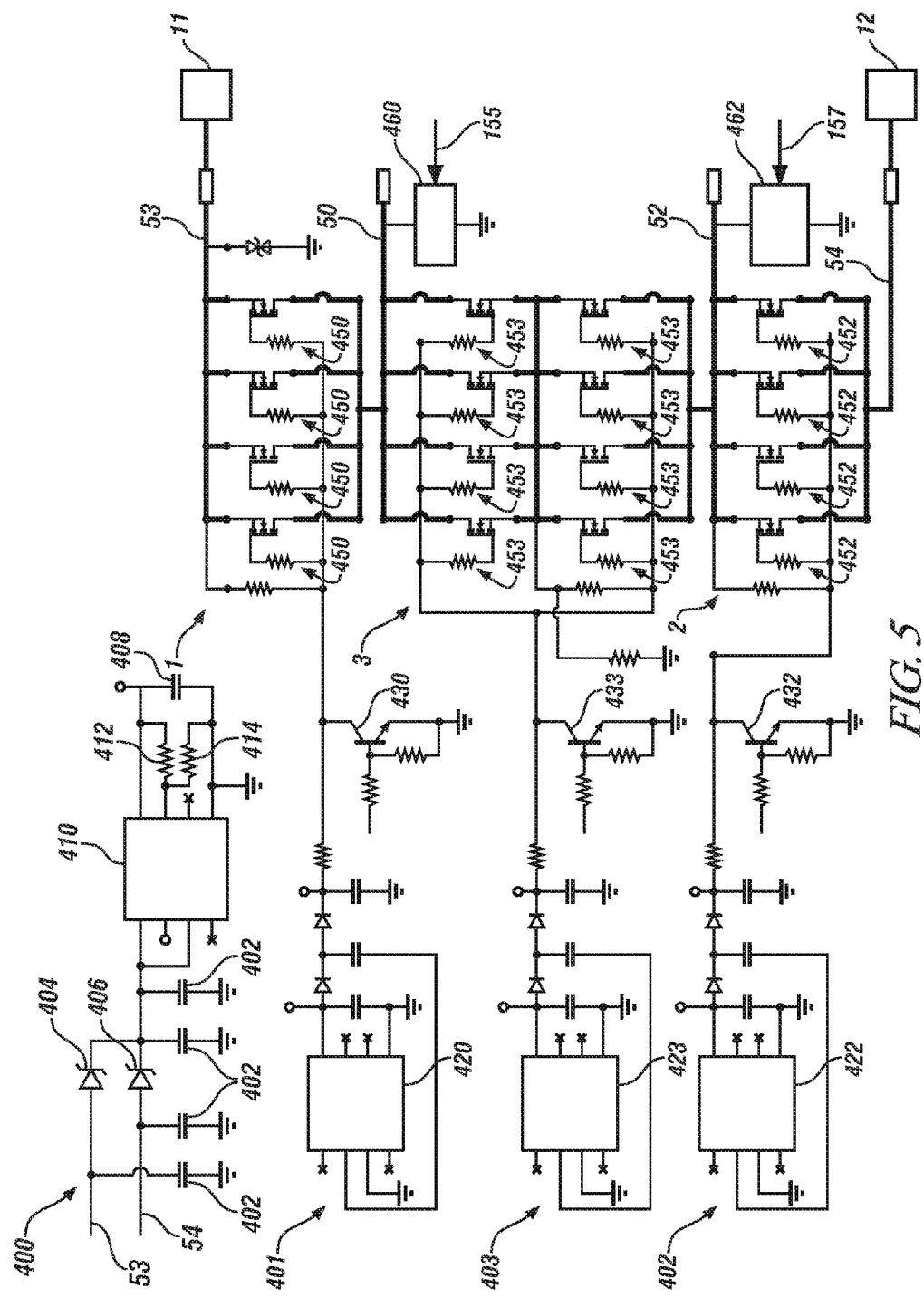
FIG. 5 illustrates a schematic of the isolator switch 3 and the first and second switches 1, 2, respectively, of FIG. 1 including a power supply circuit and respective driver circuits, in accordance with the present disclosure.

FIG. 5 illustrates a schematic of the first, second, and third isolator switches 1, 2, and 3, respectively, of FIG. 1, including a power supply circuit 400 and respective driver circuits 401, 402 and 403, in accordance with the present disclosure. Referring to the power supply circuit 400, the first connector path 53 is fed by the first independent power source 11 and the second connector path 54 is fed by the second independent power source 12. As aforementioned, the first and second power distribution paths 50, 52, respectively, and the first and second connector paths 53, 54, respectively, are arranged in parallel and can be referred to as DC buses. The first connector path 53 includes a first diode 404 and the second connector path 54 includes a second diode 406. Capacitors 402 can be incorporated between the DC bus terminals and the ground terminal. A voltage regulator chip 410 receives voltage from the first and second connector paths 50, 52, respectively. The voltage regulator chip 410 includes eight pins. The voltage regulator chip provides a regulated voltage to one of the driver circuits 401, 402, 403 to control the operation of respective ones of the first, second and third isolator switches 1, 2, 3, respectively. Feedback resistors 412 and 414 and a feedback capacitor 408 can also be included. The third driver circuit 403 responds to abnormal voltage conditions of the paths 50, 52, 53 and 54 requiring the third isolator switch 3 to be disabled and operative in the open state.

The first driver circuit 401 includes a high voltage regulator chip 420, a dissipater transistor 430 and the first isolator switch 1. In the illustrated embodiment, the first isolator switch 1 is represented schematically as an isolator circuit. Accordingly, the terms "isolator switch" and "isolator circuit" will be used interchangeably in the illustrated embodiment. The first isolator circuit 1 isolates the first independent power source 11 (e.g., first ESD) from the first parallel power distribution path 50 and includes a single or plurality of metal-oxide-semiconductor field-effect transistors (MOSFETs) 450 connected to in parallel, each having a respective resistor. A source of each MOSFET 450 is connected to the first connector path 53. A drain of each MOSFET 450 is connected to the first parallel power distribution path 50 of FIG. 1. Each respective resistor of each MOSFET 450 controls a switching speed of the first isolator circuit 1 by controlling a gate current during opening and closing events of the first isolator switch circuit 1.

The high voltage regulator chip 420 is configured to provide a voltage boost to increase the voltage applied to the charge gates of the first isolator circuit 1 in order to operate the first isolator switch 1 in the closed state. The dissipater transistor 430 is configured to discharge voltage applied to the charge gates of the first isolator switch 1 in order to open the first isolator switch 1. The dissipater transistor 430 must be grounded to change the charge applied to the gates of the first isolator switch 1 during a transmission from operating in the closed state to operating in the open state. In an exemplary embodiment, the terminal of the first parallel power distribution path 50 is electrically coupled to a first voltage clamp device 460 configured to prevent load voltage from exceeding a predetermined value, e.g., 16 V, when the predetermined operating mode, e.g., FLAAD, is active and enabled as determined by the operating mode input 155.

The second driver circuit 402 includes a high voltage regulator chip 422, a dissipater transistor 432 and the second isolator switch 2. In the illustrated embodiment, the second isolator switch 2 is represented schematically as an isolator circuit. Accordingly, the terms "isolator switch" and "isolator circuit" will be used interchangeably in the illustrated embodiment. The second isolator circuit 2 isolates the second independent power source 12 (e.g., second ESD) from the second parallel power distribution path 52 and includes a single or plurality of metal-oxide-semiconductor field-effect transistors (MOSFETs) 450 connected to in parallel, each having a respective resistor. The second isolator circuit 2 includes a single or plurality of MOSFETs 452 each having a respective resistor. A source of each MOSFET 452 is connected to the second parallel power distribution path 52. A drain of each MOSFET 452 is connected to the second connector path 54 of FIG. 1. Each respective resistor of each MOSFET 452 controls a switching speed of the second isolator circuit 2 by controlling a gate current during opening and closing events of the second isolator circuit 2.

The high voltage regulator chip 422 is configured to provide a voltage boost to increase the voltage applied to the charge gates of the second isolator circuit 2 in order to operate the second isolator switch 2 in the closed state. The dissipater transistor 432 is configured to discharge voltage applied to the charge gates of the second isolator circuit 2 in order to open the second isolator circuit 2. The dissipater transistor 432 must be grounded to change the charge applied to the gates of the second isolator switch circuit 2 during a transmission from operating in the closed state to operating in the open state. In an exemplary embodiment, the terminal of the second parallel power distribution path 52 is electrically coupled to a second voltage clamp device 462 configured to prevent load voltage from exceeding a predetermined value, e.g., 16 V, when the predetermined operating mode, e.g., FLAAD, is active and enabled as determined by the operating mode input 157.

The third driver circuit 403 includes a high voltage regulator chip 423, a dissipater transistor 433 and the third isolator switch 3. In the illustrated embodiment, the third isolator switch 3 is represented schematically as an isolator circuit. Accordingly, the terms "isolator switch" and "isolator circuit" will be used interchangeably in the illustrated embodiment. The third isolator switch circuit 3 includes a single or plurality of MOSFETs 453 connected to in parallel, each having a respective resistor. A source of each MOSFET is connected to a source of a respective parallel MOSFET. A drain of each MOSFET 453 is connected to one of the first and second parallel power distribution paths 50, 52, respectively. Each respective resistor of each MOSFET 453 controls a switching speed of the third isolator circuit 3 by controlling a gate current during events between open and closed states of the third isolator circuit 3.

Figure 6:
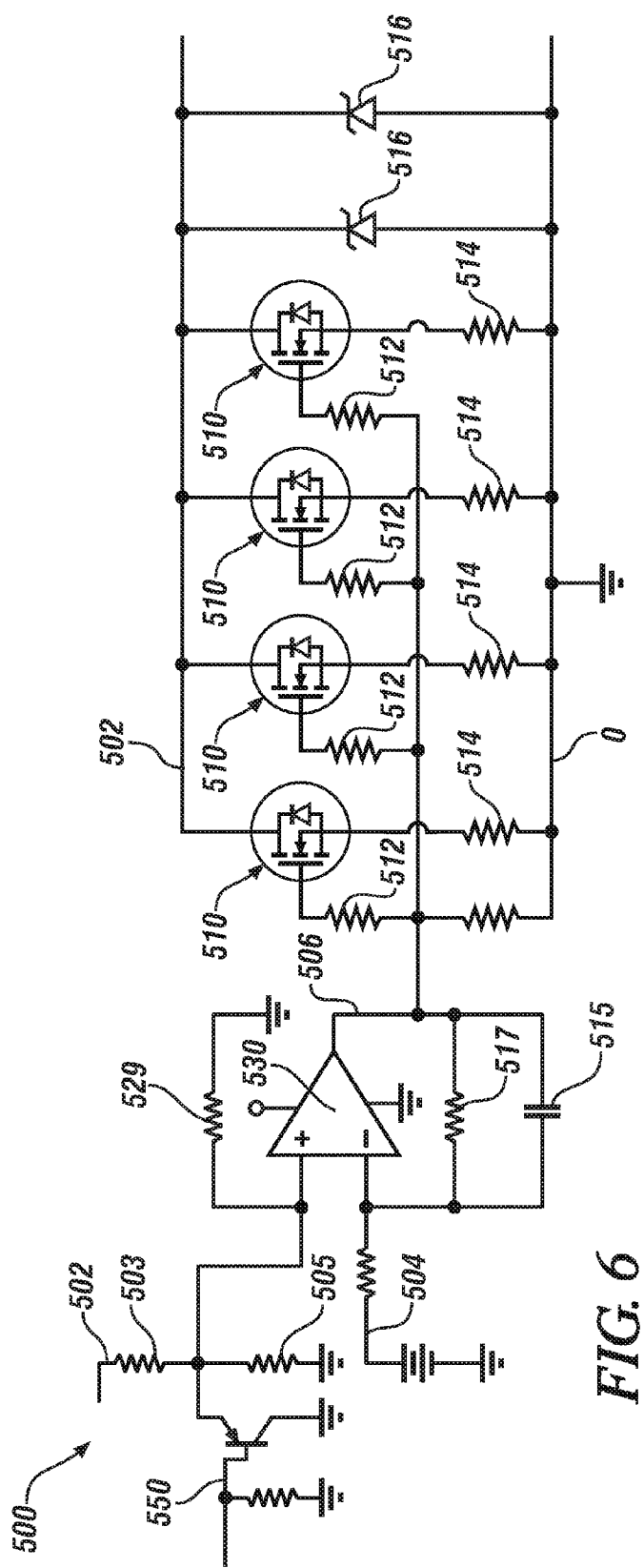
FIG. 6 illustrates a schematic of an exemplary voltage clamp circuit with reference to voltage clamp circuits 460 and 462 of FIG. 5, in accordance with the present disclosure.

FIG. 6 illustrates a schematic of an exemplary voltage clamp circuit 500 with reference to the voltage clamp devices 460 and 462 of FIG. 5, in accordance with the present disclosure. As aforementioned, the third isolator switch 3 includes the voltage clamp device 460 or 462 on a respective load side of the third isolator switch 3 for maintaining the voltage below the predetermined limit, e.g., 16 V, during enabled operation in the FLAAD mode, e.g., the predetermined operating mode. The voltage clamp circuit 500 of FIG. 6 can describe either of the first and second voltage clamp devices 460, 462, respectively, of FIG. 5. The voltage clamp circuit 500 includes at least one MOSFETs 510. In an exemplary embodiment, MOSFETs 510 are electrically coupled in parallel across a DC bus 502. Each MOSFET 510 can optionally include a source resistance 512 and a drain resistance 514 to equalize currents.

A differential amplifier 530 compares a voltage of the DC bus 502 to a reference voltage 504. The differential amplifier 530 sets the clamp voltage level through an output 506 of the differential amplifier 530. A potential divider including resistors 503 and 505 is utilized to reduce the DC bus 502 voltage to be comparable with the reference voltage 504 and is connected to the non-inverting input of the differential amplifier 530. Feedback voltage is enabled only when the predetermined operating mode (e.g., FLAAD mode) 550 is active. Gain of the differential amplifier 530 is chosen to minimize a deviation of the DC bus 502 voltage from the reference voltage 504 during voltage clamping. A capacitor 515 across a feedback resistor 517 of the differential amplifier 530 provides stability.

The output 506 of the differential amplifier 530 drives the gates of the MOSFETs 510 to operate in a linear region to adsorb enough power to maintain the clamp voltage at a preset value. In one embodiment, the preset value is 16 V+/−0.25 V. Zener diodes 516 can be optionally included across the DC bus terminals to clamp the voltage during an initial transient to below a maximum rated voltage of the loads, e.g., 40 V, before the MOSFETs 510 are activated to carry the load dump energy.

Figure 7:
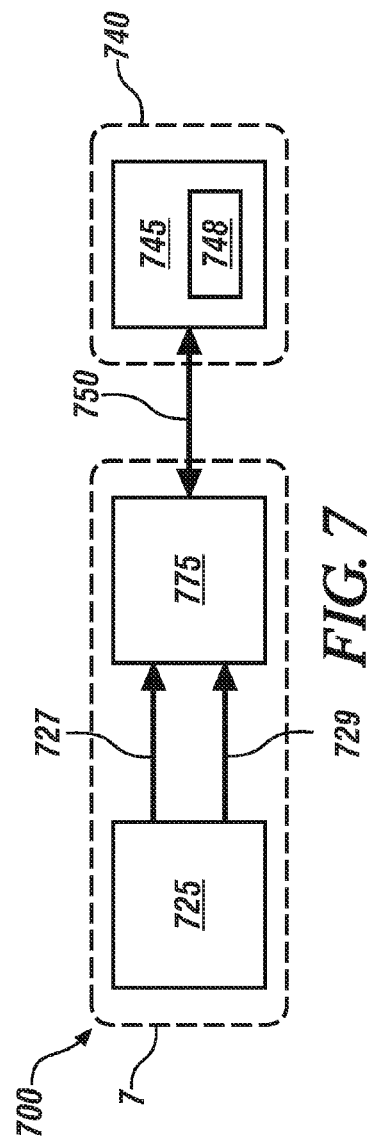
FIG. 7 illustrates a diagnostic system depicting communication between the FOPS module 7 of FIG. 1 and an exemplary FOS load for executing isolator diagnostics of the FOPS 100 of FIG. 1, in accordance with the present disclosure.

FIG. 7 illustrates a diagnostic system 700 depicting communication between the FOPS module 7 of FIG. 1 and an exemplary FOS load 740 for executing isolator diagnostics of the FOPS 100 of FIG. 1, in accordance with the present disclosure. The FOPS module 7 includes an exemplary component module 725 and an exemplary FOPS microcontroller 775. The component module 725 can store measured and monitored signals of various components of the FOPS 100. In one embodiment, the component module 725 can store the monitored voltages (e.g., first and second voltages 31 and 33) measured by the first and second voltage detectors 30, 32, respectively. Accordingly, the component module 725 can include the voltage detectors 30 and 32. In another embodiment, the component module 725 can store diagnostic status of the switches 1-6. The diagnostic status of the switches 1-6 can be selected from the group consisting of: current through, voltage across and the operating state (e.g., open or closed states) of the switches 1-6. In yet another embodiment, the component module 725 can store energy signals from the first and second independent power sources 11, 12, respectively. The energy signals from the independent power sources 11 and 12 are selected from the group consisting of: current, voltage, open circuit voltage, and a charging state.

The FOPS microcontroller 775 can include a first FOPS microcontroller respective to the first electrical center 20 electrically coupled to the first power distribution path 50 and a second FOPS microcontroller respective to the second electrical center 22 electrically coupled to the second power distribution path 52. The FOS load 740 includes a FOS module 745 that may further include non-volatile memory 748. In the illustrated embodiment, the FOS module 745 corresponds to an external object calculating (EOC) module 745. It will be appreciated that the EOC module is non-limiting and other embodiments can include the FOS module 745 corresponding to other fail operational system modules such as an electronic brake control module. Non-limiting embodiments herein will refer to the FOS module 745 interchangeably as the EOC module. The FOS load 740 can represent any one of the FOS loads 40, 42, 44 of FIG. 1, wherein each FOS load includes a first FOS module (e.g., first EOC module) respective to the first power distribution path 50 and a second FOS module (e.g., second EOC module) respective to the second power distribution path 52.

Embodiments are directed toward the FOPS microcontroller 775 serving as a slave processor to the EOC module 745. For instance, the EOC module 745 may request the FOPS microcontroller 775 to initiate required diagnostic actions during predetermined vehicle conditions via communications link 750. In response to the request via the communications link 750, the FOPS microcontroller 775 can generate diagnostic control signals 727 that are transmitted to the component module 725. Thereafter, the EOC module 745 can receive diagnostic information from the component module 725 based on the diagnostic control signal 725 generated by the FOPS microcontroller 725. Specifically, the FOPS microcontroller 725 retrieves measured signals 729 stored within the component module 725 using the diagnostic control signal 727, extracts the diagnostic information from the measured signals 729, and transmits the diagnostic information to the EOC module 745 via the communications link 750. In the illustrated embodiment, the communications link 750 is a two-way communications link; however, other embodiments envisioned can include two one-way communications links. This disclosure is not limited to the number of communication links and is only with communication between the EOC module 745 and the FOPS microcontroller 775.

The EOC module 745 may enable the predetermined operating mode requiring fail operational power based on the received diagnostic information extracted from the measured signals. For instance, diagnostic status of switches 1-6, first and second voltages measured by the first and second voltage detectors 30, 32, respectively, and the open circuit voltages of the first and second independent power sources 11, 12, respectively, may be extracted from the measured signals 727 and stored in nonvolatile memory of the microcontroller 775 and transmitted over the communications link 750 to the EOC module 745 upon request. The EOC module 745 may be further configured to determine a state of health (SOH) of various components encompassed by the component module 725 based on predetermined rules and store the results in the nonvolatile memory 748 for future use prior to and during operation in the predetermined operating mode. For instance, the EOC module 745 may determine the SOH of the first independent power source 11, e.g., the first ESD, and the SOH of the second independent power source 12, e.g., the second ESD, based on the electrical signals stored within the component module 725 and transmitted as the diagnostic information to the EOC module 745 upon the request. In some embodiments, the SOH of the independent power sources 11 and 12 determined by the EOC module 745 must exceed a predetermined SOH before the predetermined operating mode is permitted to be enabled. In one embodiment, the SOH of each of the independent power sources 11 and 12 exceeds the predetermined SOH when a state of charge of each of the independent power sources 11 and 12 is greater than 90%.

Execution of isolator diagnostics performed by the diagnostic system 700 are executed in a manner that is not perceptible to the driver of the vehicle. In one embodiment, execution of the isolator diagnostics can include testing isolator switches 1-3, snub switches 4 and 5, and test load switch 6 for functionality once per ignition cycle. Testing the functionality of the switches 1-6 can include monitoring the diagnostic status of each of the switches 1-6. As aforementioned, the diagnostic status can include the current through, the voltage across and the operating state (e.g., open or closed states) of the switches 1-6. Testing the functionality of the first and second snub switches 4 and 5 and the test load switch 6 can be performed by monitoring voltage across respective ones of the one or more resistors configured to limit current through respective ones of the switches 4-6. In one embodiment, the one or more resistors respective to the snub switches 4 and 5 are illustrated as the drain resistors 514 of the voltage clamp circuit 500 of FIG. 6.

In another embodiment, execution of isolator diagnostics can further include testing the first and second voltage detector 30, 32, respectively, for functionality once per ignition cycle in conjunction with testing the functionality of the third isolator switch 3. For instance, the first and second voltages 31, 33, respectively, detected by respective ones of the first and second voltage detectors 30, 32, respectively, can be monitored. By alternately adjusting the voltage thresholds 35 and 36, the first and second voltage detectors 30 and 31 can be monitored at 212. In one embodiment, the functionality of the third isolator switch is tested when a monitored current through the third isolator switch is not greater than a current threshold. In a non-limiting embodiment, the current threshold is 10 Amps. Alternatively or additionally, the functionality of the third isolator switch is tested when the SOC of each of the first and second independent power sources is at least the SOC threshold. In a non-limiting embodiment, the SOC threshold is 90%.

In yet another embodiment, execution of isolator diagnostics can further include testing of current delivered by the second independent power source 12. The current delivered by the second independent power source 12 may be tested by applying a resistive load drawing a test current for a test duration upon enabling the predetermined operating mode, and subsequently, periodically drawing the test current until the predetermined operating mode is disabled. In a non-limiting example, the test current is 40 Amps, the test duration is 100 milliseconds, and the test current is periodically drawn every 10 minutes. During the testing of the current delivery by the second independent power source 12, the voltage of the second independent power source 12 is forbidden to drop below a threshold voltage, e.g., 12 Volts, that varies as a function of temperature during the duration of the test load. The test load switch 6 may be used to switch the resistive load to the second independent power source 12 to ground when the second isolator switch 2 is operative in the open state.

In yet another embodiment, execution of isolator diagnostics can further include testing of the first and second isolator switches 1, 2, respectively, once per ignition cycle. Using the monitored voltage measurements of the electrical signals of the first and second independent power sources 11, 12, respectively, the first and second isolator switches 1, 2, respectively can each be separately switched to operation in respective open states during charging conditions of the first and second independent power sources 11, 12, respectively, e.g., first and second ESDs.

In yet another embodiment, execution of isolator diagnostics can further include testing of the measured open circuit voltages of the first and second independent power sources 11, 12, respectively, at least once during Ignition-off and periodically during Ignition-on. The measured open circuit voltages are measured by alternately switching the first and second isolator switches 1, 2, respectively, between operation in open and closed states. The isolator switches 1 and 2 are alternatively switched between operation in open and closed states at least once during a Key-OFF event and periodically during a Key-ON event to determine that the open circuit voltages remains above an open circuit voltage threshold, e.g., 12.6 V, and the SOC of the first and second independent power sources 11, 12, respectively, remain above the SOC threshold, e.g., 90%, as a function of temperature.

Exemplary embodiments of the diagnostic system 700 are directed toward communicating a plurality of isolator signals. For instance, the predetermined operating mode can be enabled, e.g., FLAAD mode, via an enabling signal from the EOC module 745 including the first EOC module to the first voltage detector 30 of the component module 725, and via an enabling signal from the EOC module 745 including the second EOC module to the second voltage detector 32 of the component module 725. Thereafter, enabled predetermined operating mode feedback can be provided via a feedback signal from the first voltage detector 30 to the first EOC module and enabled predetermined operating mode feedback can be provided via the feedback signal from the second voltage detector 32 to the second EOC module. The enabled predetermined operating mode feedback can include one of the normal and abnormal conditions determined by each of the first and second voltage detectors 30, 32, respectively. In one embodiment, the enabled predetermined operating mode feedback is provided from the FOPS microprocessor 775 to the EOC module 745 via the communications link 750. In another embodiment, a signal indicating a high or low first monitored voltage 31 detected by the first voltage detector 30 can be transmitted through the first FOPS microcontroller (e.g., FOPS microcontroller 775) to the first EOC module (e.g., EOC module 745). Likewise, a signal indicating a high or low second monitored voltage 33 detected by the second voltage detector 32 can be transmitted through the second FOPS microcontroller (e.g., FOPS microcontroller 775) to the second EOC module (e.g., EOC module 745).

Isolator signals may further include a high current B+ signal from the first isolator switch 1 to the first independent power source 11, and a high current B+ signal from the second isolator switch 2 to the second independent power source 12. A connection signal between the first and second electrical centers 20, 22, respectively, can be sent from the third isolator switch 3 to the first electrical center 20 in one embodiment, and can be sent from the third isolator switch 3 to the second electrical center 22 in another embodiment. A first dirty ground signal can be sent from the first snub switch 4 to a ground and a second dirty ground signal can be sent from the second snub switch 5 to the ground. A first clean ground signal can be sent from the first voltage detector 30 to the ground and a second clean ground signal can be sent from the second voltage detector 32 to the ground.

In some embodiments, a plurality of Local Interconnect Network (LIN) signals can be communicated using the diagnostic system 700. For instance, a high voltage diagnostic enable signal can be sent from the first EOC module (e.g., EOC module 745) to the first voltage detector (e.g., component module 725), or from the second EOC module (e.g., EOC module 745) to the second voltage detector 32 (e.g., component module 725). A low voltage diagnostic enable signal can be sent from the first EOCM to the first voltage detector 30, or from the second EOC module to the second voltage detector 32. Isolator status and data can be communicated between the FOPS microcontroller 775 and the EOC module 745 via the communications link 750. In one embodiment, the communications link 750 includes the LIN.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a diagnostic system of a vehicle including a fail operational power system (FOPS) module and a fail operational system (FOS) load, comprising:
   providing said FOPS module with first and second independent power sources, and first and second parallel power distribution paths, each power distribution path powered by one of said independent power sources;
   providing said FOS load with first and second FOS modules, each FOS module respective to one of said first and second power distribution paths;
   requesting, at the FOS modules, a microcontroller of the FOPS module to generate a diagnostic control signal;
   receiving, at the FOS modules, diagnostic information from a component module of the FOPS module based on the diagnostic control signal generated by the microcontroller; and
   executing, at the FOS modules, isolator diagnostics based on the received diagnostic information.

2. The method of claim 1, wherein the diagnostic information from the component module is received by the FOS module when the microcontroller:
   retrieves measured signals stored within the component module using the diagnostic control signal;

extracts the diagnostic information from the measured signals; and transmits the diagnostic information to the FOS module.

3. Method for operating a diagnostic system of a vehicle including a fail operational power system (FOPS) module and a fail operational system (FOS) module, comprising:

requesting, at the FOS module, a microcontroller of the FOPS module to generate a diagnostic control signal;

receiving, at the FOS module, diagnostic information from a component module of the FOPS module based on the diagnostic control signal generated by the microcontroller; and executing, at the FOS module, isolator diagnostics based on the received diagnostic information;

wherein the diagnostic information from the component module is received by the FOS module when the microcontroller:

retrieves measured signals stored within the component module using the diagnostic control signal;

extracts the diagnostic information from the measured signals; and transmits the diagnostic information to the FOS module; and wherein the diagnostic information received from the component module includes at least one of:

energy signals from each of first and second independent power sources, each of the independent power sources supplying power via respective ones of first and second power distribution paths arranged in parallel to a load;

a first voltage on the first power distribution path monitored by a first voltage detector and a second voltage on the second power distribution path monitored by a second voltage detector; and a diagnostic status of each of a plurality of switches, the plurality of switches including a first isolator switch effective when operative in a closed state to power the first power distribution path supplied by the first independent power source, a second isolator switch effective when operative in a closed state to power the second power distribution path supplied by the second independent power source, a third isolator switch effective when operative in a closed state to connect the first and second power distribution paths via a connector path, first and second snub switches configured to snub voltages over a predetermined level from load dumps when a predetermined operating mode requiring fail operational power is enabled, and a test load switch effective when operative in a closed state to apply a test load to the second independent power source.

4. The method of claim 3, wherein the energy signals of the first and second power sources are selected from the group consisting of: delivered current, voltage, open circuit voltage, and charging state.

5. The method of claim 3, wherein the executed isolator diagnostics based on the received diagnostic information comprises:

testing functionality of the first and second snub switches and the test load switch based upon a monitored voltage across each of a plurality of resistors, each resistor respective to one of the first and second snub switches and the test load switch and configured to limit current through the respective ones of the first and second snub switches and the test load switch.

6. The method of claim 3, wherein the executed isolator diagnostics based on the received diagnostic information comprises:

at least once per ignition cycle, testing functionality of the first and second voltage detectors in conjunction with testing functionality of the third isolator switch.

7. The method of claim 6, wherein the functionality of the third isolator switch is tested when at least one of:

a monitored current through the third isolator switch is not greater than a current threshold; and a state of charge of each of the first and second independent power sources is at least a state of charge threshold.

8. The method of claim 3, wherein the executed isolator diagnostics based on the received diagnostic information comprises:

in response to enabling the predetermined operating mode requiring fail operational power, applying a resistive load drawing a test current for a test duration to test delivered current by the second independent power source; and periodically applying the restive load drawing the test current until the predetermined operating mode requiring fail operational power is disabled.

9. The method of claim 8, wherein the second isolator switch is operative in an open state when the resistive load drawing the test current is applied.

10. The method of claim 3, wherein the executed isolator diagnostics based on the received diagnostic information comprises:

during charging states of the first and second independent power sources once per ignition cycle, separately switching operation of the first and second isolator switches to operation in respective open states for testing functionality.

11. The method of claim 3, wherein the executed isolator diagnostics based on the received diagnostic information comprises:

alternately switching the first and second isolator switches between open and closed states; and measuring open circuit voltages of the first and second independent power sources during the alternately switching of the first and second isolator switches.

12. The method of claim 11, wherein the first and second isolator switches are alternately switched at least once during a Key-OFF event and periodically during a Key-ON event such that the open circuit voltages remain above an open circuit threshold.

13. The method of claim 3, further comprising:

enabling, at the FOS module, the predetermined operating mode requiring fail operational power based on the received diagnostic information; and transmitting, at the FOS module, an enable signal to each of the first and second voltage detectors.

14. The method of claim 13, further comprising:

determining, at the FOS module, a state of health of each of the first and second independent power sources based on the received diagnostic information, wherein the enabling the predetermined operating mode requiring fail operational power is further based upon the state of health of each of the first and second independent power sources.

15. The method of claim 3, wherein the received diagnostic information from the component module further comprises:

when the predetermined operating mode requiring fail operational power is enabled:
receiving, at the FOS module, predetermined operating mode feedback from the first voltage detector, the predetermined operating mode feedback including one of a normal condition and an abnormal condition based on the monitored first voltage; and
receiving, at the FOS module, the predetermined operating mode feedback from the second voltage detector, the predetermined operating mode feedback including one of the normal condition and the abnormal condition based on the monitored second voltage.

16. The method of claim 3, wherein the FOS module comprises:
a first FOS module respective to the first power distribution path, the first voltage detector and the first independent power source; and
a second FOS module respective to the second power distribution path, the second voltage detector and the second independent power source.

17. The method of claim 3, wherein the microcontroller comprises:
a first microcontroller respective to the first power distribution path and a second microcontroller respective to the second power distribution path.

18. An apparatus, comprising:
a first power distribution path powered by a first energy storage device for supplying electrical power to loads partitioned on the first power distribution path;
a second power distribution path parallel to the first power distribution path and powered by a second energy storage device for supplying electrical power to the loads partitioned on the second power distribution path;
a first voltage detector configured to monitor a first voltage on the first power distribution path and determine one of a normal condition and an abnormal condition based on the first monitored voltage;
a second voltage detector configured to monitor a second voltage on the second power distribution path and determine one of a normal condition and an abnormal condition based on the second monitored voltage;
a first isolator switch effective when operative in a closed state to power the first power distribution path by the first energy storage device for supplying electrical power to the loads;
a second isolator switch effective when operative in a closed state to power the second power distribution path by the second energy storage device for supplying electrical power to the loads;
a third isolator switch configured to
connect the first and second parallel power distribution paths via a connector path when the isolator switch is operative in a closed state when the normal condition is detected by both of the first and second voltage detectors, and
open the connection between the first and second power distribution paths when at least one of the first and second voltage detectors detects the abnormal condition;
a plurality of voltage clamp circuits, each voltage clamp circuit connected to and monitoring respective ones of the first and second power distribution paths, each voltage clamp circuit limiting a maximum voltage transient on the respective power distribution path to a predetermined magnitude;
a fail operational power system (FOPS) module comprising
a component module configured to store diagnostic information, and
a microcontroller configured to generate a diagnostic control signal sent to the component module and receive the diagnostic information from the component module; and
a fail operational system (FOS) module including non-volatile memory, the FOS module configured to
receive the diagnostic information transmitted from the microcontroller, and
request the microcontroller to execute isolator diagnostics based on the received diagnostic information.

19. The apparatus of claim 18, wherein the FOS module is further configured to:
enable a predetermined operating mode requiring fail operational power based on the received diagnostic information; and
transmit an enable signal to each of the first and second voltage detectors.

20. The apparatus of claim 19, further comprising:
fourth and fifth snub switches configured to snub voltages over a predetermined level from load dumps when the predetermined operating mode requiring fail operational power is enabled; and
a sixth switch configured to check the state of health of the second energy storage device when a test load is applied.

* * * * *